US009250003B2

(12) United States Patent
Kim et al.

(10) Patent No.: US 9,250,003 B2

(45) Date of Patent: Feb. 2, 2016

(54) ROBOT REFRIGERATOR AND SYSTEM HAVING THE SAME

(75) Inventors: Sangoh Kim, Seoul (KR); Sungil Park, Seoul (KR); Namgi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 13/382,994

(22) PCT Filed: Aug. 6, 2010

(86) PCT No.: PCT/KR2010/005181

§ 371 (c)(1),
(2), (4) Date: Jan. 9, 2012

(87) PCT Pub. No.: WO2011/016699

PCT Pub. Date: Feb. 10, 2011

(65) Prior Publication Data

US 2012/0109378 A1 May 3, 2012

(30) Foreign Application Priority Data

Aug. 6, 2009 (KR) ........................ 10-2009-0072425

(51) Int. Cl.
*G05B 15/00* (2006.01)
*F25D 11/00* (2006.01)
(Continued)

(52) U.S. Cl.
CPC .............. *F25D 11/00* (2013.01); *F25D 29/003* (2013.01); *G08C 17/00* (2013.01); *F25B 2600/07* (2013.01); *F25D 25/04* (2013.01); *F25D 2400/38* (2013.01); *G08C 2201/50* (2013.01)

(58) Field of Classification Search
CPC ...... B25J 11/00; F25D 2400/20; F25D 11/00; F25D 2400/38; F25D 25/04; F25D 29/003; F25B 2600/07; G08C 17/00; G08C 2201/50
USPC .......................................................... 700/259
See application file for complete search history.

(56) References Cited

U.S. PATENT DOCUMENTS 3,982,801 A * 9/1976 Heidorn ................. A47B 57/06
108/147
5,179,843 A * 1/1993 Cohausz ............... A47F 3/0486
62/237

(Continued)

FOREIGN PATENT DOCUMENTS

EP 0 470 513 2/1992
JP 07-151439 6/1995

(Continued)

OTHER PUBLICATIONS

Keen, S., Ye, W. Zamstein, L., Schwartz, E. M., and Arroyo, A.. Koolio: An Autonomous Refrigerator Robot. 2006. University of Florida.*

(Continued)

*Primary Examiner* — Khoi Tran
*Assistant Examiner* — Robert Nguyen
(74) *Attorney, Agent, or Firm* — Ked & Associates LLP

(57) ABSTRACT

A robot refrigerator and a robot refrigerator system are provided. The robot refrigerator is remotely controlled. The robot refrigerator generates image information from a surrounding image and transmits the generated image information to a wireless communication device. The wireless communication device remotely controls the robot refrigerator, or monitors or remotely controls the robot refrigerator in real time, so that the robot refrigerator easily avoids an obstacle, and thus, minimizes a movement time of the robot refrigerator. Thus, user convenience and system reliability is improved.

21 Claims, 7 Drawing Sheets

(51) Int. Cl.

| | |
|---|---|
| ***F25D 29/00*** | (2006.01) |
| ***G08C 17/00*** | (2006.01) |
| *F25D 25/04* | (2006.01) |

(56) References Cited

U.S. PATENT DOCUMENTS

| | | | | |
|---|---|---|---|---|
| 5,596,319 | A | 1/1997 | Spry | |
| 7,693,605 | B2 * | 4/2010 | Park | 700/245 |
| 7,769,492 | B2 * | 8/2010 | Wang et al. | 700/257 |
| 2001/0054291 | A1 | 12/2001 | Roh et al. | |
| 2006/0217837 | A1 | 9/2006 | Koga et al. | |
| 2007/0192910 | A1 * | 8/2007 | Vu et al. | 901/17 |
| 2007/0198130 | A1 | 8/2007 | Wang et al. | |
| 2008/0027591 | A1 * | 1/2008 | Lenser et al. | 701/2 |
| 2010/0100241 | A1 * | 4/2010 | Jarisch | B25J 11/00 700/259 |
| 2010/0176703 | A1 * | 7/2010 | Kim | F25D 25/02 312/408 |

FOREIGN PATENT DOCUMENTS

| | | |
|---|---|---|
| KR | 10-2002-0012440 | 2/2002 |
| KR | 10-2004-0059610 | 7/2004 |
| KR | 10-2004-0077473 | 9/2004 |
| KR | 10-2006-0009058 | 1/2006 |
| KR | 10-0655011 | 12/2006 |
| KR | 10-0772963 | 11/2007 |

OTHER PUBLICATIONS

International Search Report issued in PCT Application No. PCT/KR 2010/005181 dated Feb. 21, 2011.

Korean Office Action dated Jul. 9, 2015.

European Search Report dated Nov. 2, 2015.

* cited by examiner

ROBOT REFRIGERATOR AND SYSTEM HAVING THE SAME

TECHNICAL FIELD

The present invention relates to a robot refrigerator capable of avoiding an obstacle according to a remote control signal of a wireless communication device and easily moving around.

BACKGROUND ART

In general, a refrigerator is a device for keeping storage items such as food, beverage, and the like, in storage for a long period of time, and refrigerating or freezing storage items according to their types desired to be kept in storage.

The refrigerator operates according to driving of a compressor provided therein. Cooling air provided to the interior of the refrigerator is generated according to a heat exchange operation of a refrigerant and continuously provided to the interior of the refrigerator according to a repeated cycling operation of compression-condensation-expansion-evaporation. The provided refrigerant is evenly transferred to the interior of the refrigerator according to a convection current to allow the food items within the refrigerator to be kept at a desired temperature.

Recently, consumers demand for refrigerators that may provide a great utilization efficiency of the storage space capable of storing various storage items that change according to the elevation of the standard of living, as well as the conventional cooling efficiency, is increasing. Also, demand for various additional functions improving user convenience is increasing. For example, users are becoming interested in a robot refrigerator including a robot technique. Namely, users who want to use a refrigerator show an interest in the technique of moving and using a refrigerator by using a remote controller.

DISCLOSURE OF INVENTION

Technical Problem

The related art fixed refrigerator has a problem in that when the user wants to use the refrigerator, he must move up to the refrigerator.

Meanwhile, in the related art robot refrigerator, when the robot refrigerator is placed at area unseen or when the robot refrigerator is located at a remote area, the user cannot observe a movement path of the refrigerator, the refrigerator s movement is blocked and time for the robot refrigerator to move to the user is delayed.

Solution to Problem

Therefore, in order to address the above matters, the various features described herein have been conceived.

An aspect of the present invention provides a robot refrigerator that can be remotely controlled.

Another aspect of the present invention provides a robot refrigerator capable of generating image information from a surrounding image and transmitting the generated image information to a wireless communication device to allow the wireless communication device to remotely control the movement of the robot refrigerator, and a robot refrigerator system including the same.

Another aspect of the present invention provides a robot cleaner capable of transmitting a surrounding image in real time to a wireless communication device to allow the wireless communication device to monitor and remotely control the robot refrigerator in real time, and a robot refrigerator system including the same.

According to an aspect of the present invention, there is provided a robot refrigerator including: a main body having a storage space therein and wheels disposed at a lower portion thereof; a first control unit configured to transmit status information to an external device and control the operation of the main body based on a remote control signal from the external device; and a second control unit configured to generate image information from a surrounding image and transmit the generated image information to the external device. The robot refrigerator may further include: a running motor provided in the main body and rotating the wheels to move the main body; and a lifting motor provided in the main body and lifting or lowering the storage space.

The first control unit may include: a running motor driving unit configured to drive the running motor based on the remote control signal; a lifting motor driving unit configured to drive the lifting motor; a cooling unit configured to adjust the temperature in the interior of the storage space; and a first communication unit configured to transmit the status information to the external device.

The second control unit may include: an image processing unit configured to process the surrounding image to generate image information; and a second communication unit configured to transmit the image information to the external device. In this case, the remote control signal may be generated based on the image information.

The robot refrigerator may further include: an obstacle detection unit configured to detect a nearby obstacle, wherein the first control unit determines whether to move the robot refrigerator according to the presence or absence of an obstacle. The robot refrigerator may further include: a power unit connected to an external power source so as to be charged, and supplying power when the robot refrigerator is moving.

The main body may include: an output unit configured to output a current status of the robot refrigerator to the exterior; and an input unit configured to directly receive a command from the exterior.

According to another aspect of the present invention, there is provided a robot refrigerator system including: a robot refrigerator having a storage space therein and wheels provided at a lower portion thereof, transmitting current status information and image information according to a surrounding image, and moving based on a remote control signal; and a wireless communication device configured to generate the remote control signal based on the current status information and the image information of the robot refrigerator and transmit the remote control signal to control the robot refrigerator.

The robot refrigerator may include: a running motor rotating the wheels to move the main body; a lifting motor lifting or lowering the storage space; a running motor driving unit configured to drive the running motor based on the remote control signal; a lifting motor driving unit configured to drive the lifting motor; a cooling unit configured to adjust the temperature in the interior of the storage space; a first communication unit configured to transmit the status information to the wireless communication unit; and a second communication unit configured to transmit the image information to the wireless communication unit. The first communication unit may perform transmission and reception through Bluetooth™. The second communication unit performs transmission and reception through Wi-Fi. The robot refrigerator may further include: an obstacle detection unit configured to detect a nearby obstacle. The robot refrigerator may further include: a power unit connected to an external power source so as to be charged, and supplying power when the robot refrigerator is moving.

The robot refrigerator system may further include: a power supply unit connected with the robot refrigerator, supplying power to the robot refrigerator from an external power source, or charging the power unit. The power supply unit may include: a location signal generation unit configured to transmit an induction signal for inducing the robot refrigerator to return.

The wireless communication unit may include: a third communication unit configured to receive the status information from the robot refrigerator and transmitting the remote control signal to the robot refrigerator; and a fourth communication unit configured to receive the image information from the robot refrigerator. The third communication unit may perform transmission and reception through Bluetooth™. The fourth communication unit may perform transmission and reception through Wi-Fi. The wireless communication device may further include: a display unit configured to display the received status information and image information.

The wireless communication device may be one of a mobile phone, a personal digital assistant (PDA), and a smartphone.

Advantageous Effects of Invention

According to exemplary embodiments of the present invention, because the robot refrigerator can be remotely controlled, users can easily use the refrigerator.

Also, because the robot refrigerator generates image information from a surrounding image and transmits the generated image information to a wireless communication device, and the wireless communication device remotely controls the robot refrigerator, so that the robot refrigerator can easily avoid an obstacle to thus minimize a movement time of the robot refrigerator. Thus, user convenience and system reliability can be improved.

In addition, because the robot refrigerator transmits the surrounding image to the wireless communication device in real time, real time monitoring and remote controlling can be performed.

The foregoing and other objects, features, aspects and advantages of the present invention will become more apparent from the following detailed description of the present invention when taken in conjunction with the accompanying drawings.

BEST MODE FOR CARRYING OUT THE INVENTION

A robot refrigerator according to exemplary embodiments of the present invention will now be described with reference to the accompanying drawings.

Figure 1:
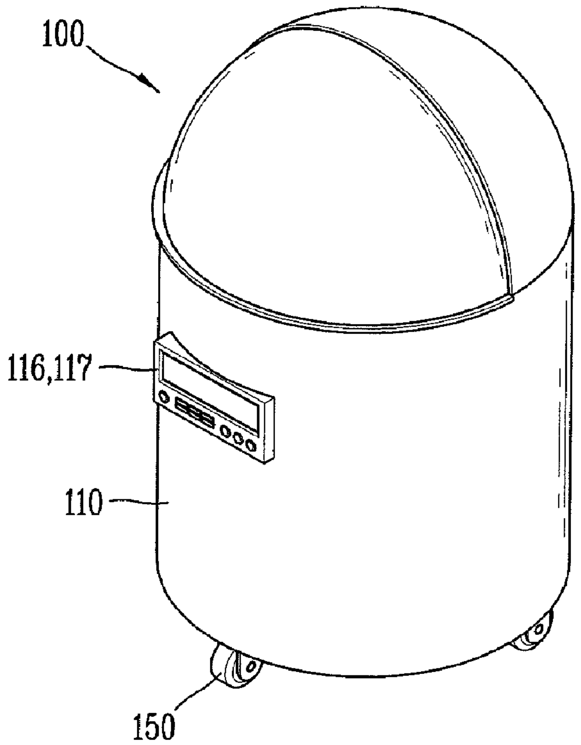
FIG. 1 is a perspective view showing an external appearance of a robot refrigerator according to an exemplary embodiment of the present invention.
Figure 2:
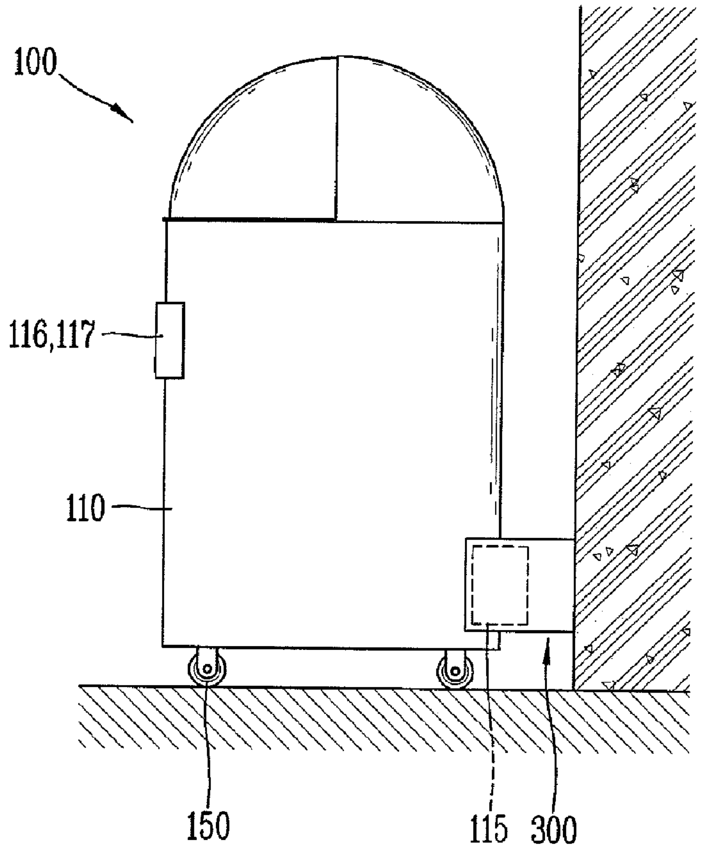
FIG. 2 is a view for explaining a charging operation of the robot refrigerator in a fixed state according to an exemplary embodiment of the present invention.
Figure 3:
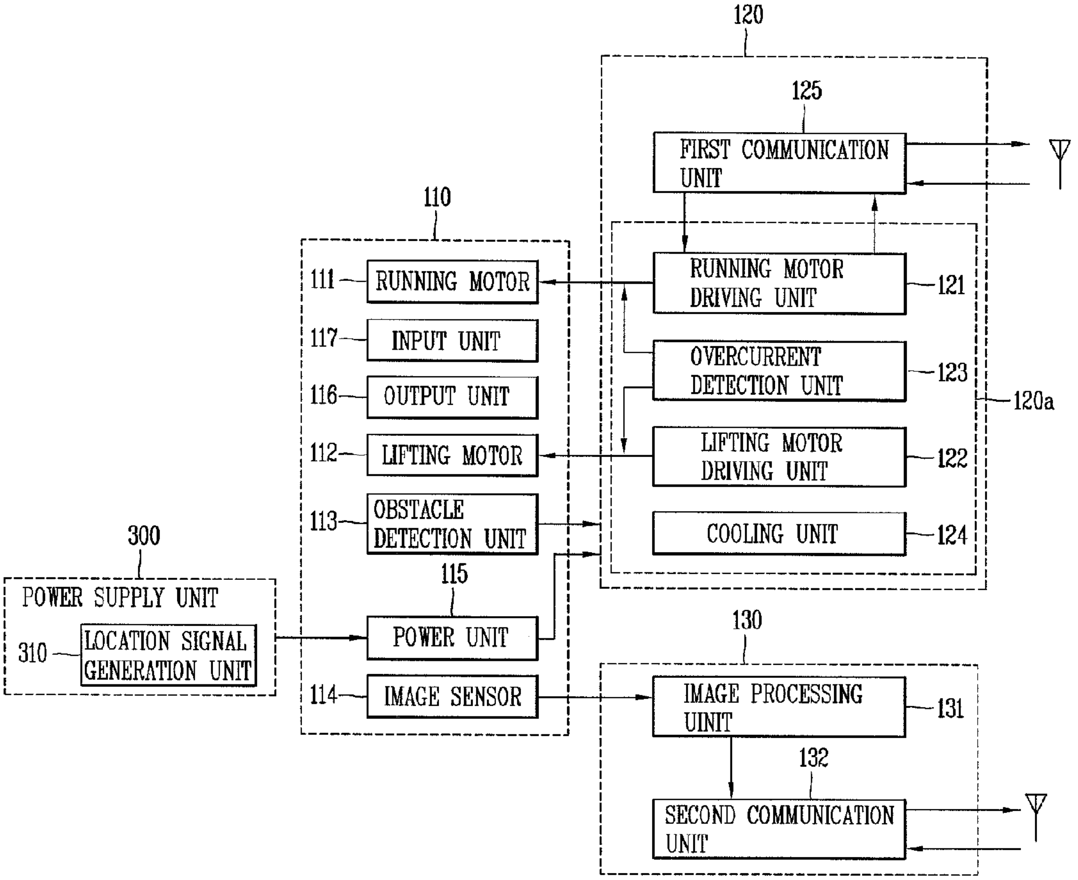
FIG. 3 is a block diagram showing a detailed configuration of the robot refrigerator according to an exemplary embodiment of the present invention.
Figure 4:
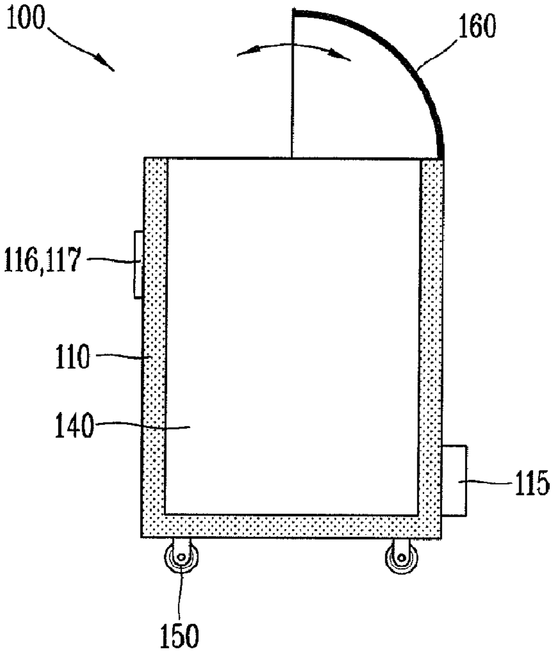
FIG. 4 shows a robot refrigerator according to a first exemplary embodiment of the present invention.
Figure 5:
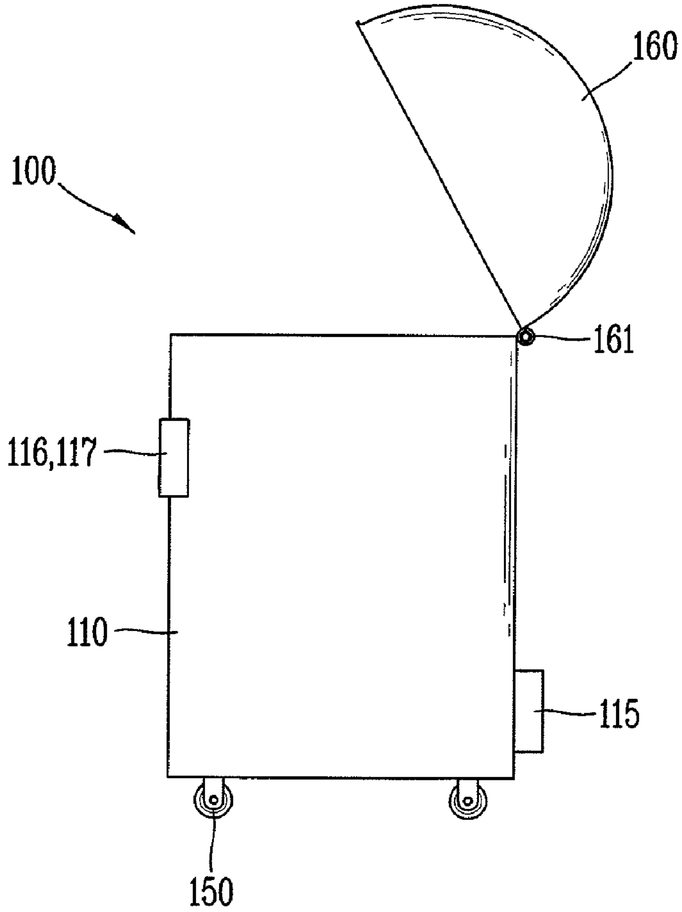
FIG. 5 shows a robot refrigerator according to a second exemplary embodiment of the present invention.
Figure 6:
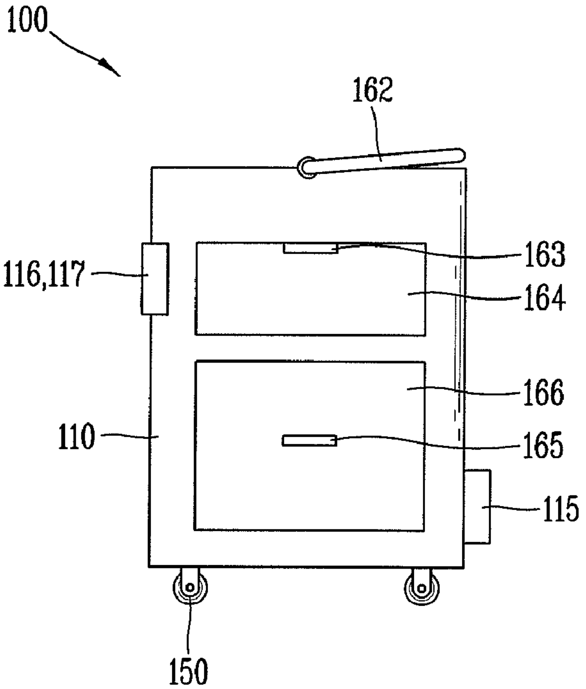
FIG. 6 shows a robot refrigerator according to a third exemplary embodiment of the present invention.
Figure 7:
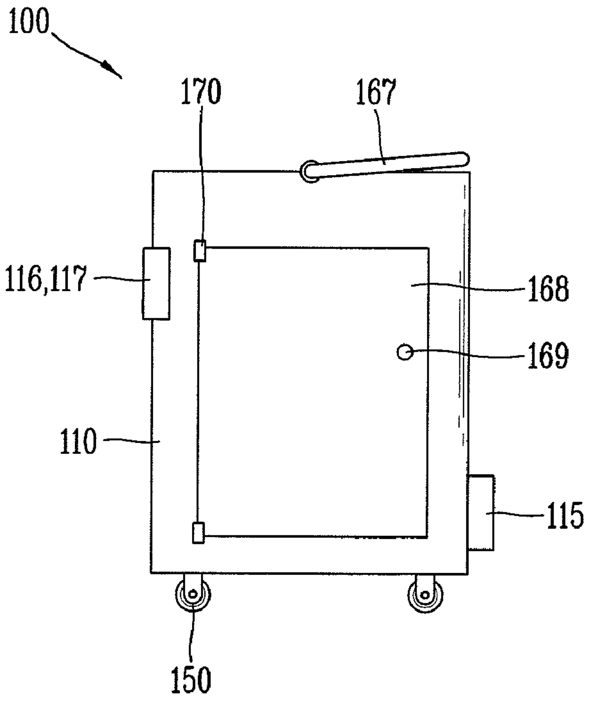
FIG. 7 shows a robot refrigerator according to a fourth exemplary embodiment of the present invention.

With reference to FIGS. 1 to 3, the robot refrigerator according to an exemplary embodiment of the present invention includes a main body 110 including a storage space therein and wheels 150 provided at a lower portion thereof, a first control unit 120 configured to transmit status information to an external device and control the operation of the main body 110 based on a remote control signal from the external device, and a second control unit 130 configured to generate image information from a surrounding image and transmit the generated image information to the external device. Namely, the first control unit 120 transmits status information of the main body, namely, an inner temperature of the refrigerator, ambient temperature, the amount of storage items, a remaining battery capacity, and the like, to the external device and receives a remote control signal from the external device. The second control unit 130 captures an ambient image to generate image information and transmits the generated image information to the external device. In this case, the robot refrigerator and the external device are connected in real time, so the surroundings of the robot refrigerator can be monitored and the robot refrigerator can be moved in real time according to a remote control signal from the external device. Of course, the first and second control units 120 and 130 may be implemented as a single microcomputer, but because they perform different operations, the first and second control units 120 and 130 are preferably configured as separate boards or modules.

Here, a remote controller may be used as the external device. In particular, a wireless communication device may be used as the external device, and in this case, the wireless communication device may be one of a mobile phone, a personal digital assistant (PDA), and a smartphone.

The robot refrigerator according to an exemplary embodiment of the present invention may further include a running motor 111 provided in the main body 110 and rotating the wheels to move the main body 110, and a lifting motor 112 provided in the main body 110 and lifting or lowering the storage space.

A direct current (DC) motor is generally used as the running motor 111. The running motor 111 moves the main body 110 of the robot refrigerator to a user desired location.

The robot refrigerator according to an exemplary embodiment of the present invention may further include a running motor driving unit 121 configured to drive the running motor based on the remote control signal, a lifting motor driving unit 122 configured to drive the lifting motor based on the remote control signal, a cooling unit 124 configured to adjust the temperature in the interior of the storage space, and a first communication unit 125 configured to transmit the status information to the external device. In addition, the robot refrigerator may further include an overcurrent detection unit 123 configured to detect an overcurrent when the running motor 111 and the lifting motor 112 are driven, to thereby protect the unit.

The running motor driving unit 121 drives the running motor 111 according to a remote control signal from the external device to move the main body 110 of the robot refrigerator to a user desired location. The lifting motor driving unit 122 drives the lifting motor according to a remote control signal or a direct input command applied to the input unit 116 in order to allow the user to easily select a storage item or store an item within the refrigerator.

The cooling unit 124 includes a relay and a driving unit for driving the relay to refrigerate or freezing storage items within the refrigerator.

The second control unit 130 includes an image processing unit 131 configured to process the surrounding image to generate image information, and a second communication unit 132 configured to transmit the image information to the external device. In this case, the remote control signal may be generated based on the image information or based on the image information and the status information. Namely, the surrounding image acquired through an image sensor 114 provided in the main body 110 of the refrigerator is processed by the image processing unit 131 to generate the image information, and the image information is transmitted to the external device through the second communication unit 132.

The robot refrigerator according to an exemplary embodiment of the present invention may further include an obstacle detection unit 113 configured to detect a nearby obstacle, and the first control unit 120 determines whether to move the robot refrigerator according to the presence or absence of an obstacle. Also, the robot refrigerator according to an exemplary embodiment of the present invention may further include a power unit 115 connected to an external power source, namely, a power supply unit 300, so as to be charged, and supplying power when the robot refrigerator is moving. An infrared sensor, a radio frequency (RF) sensor, a supersonic sensor, and the like, may be used as the obstacle detection unit 113. In an exemplary embodiment of the present invention, when the robot refrigerator moves according to a remote control signal corresponding to the image information transmitted through the second control unit 130, when the robot refrigerator receives no remote control signal, or when the robot refrigerator cannot transmit image information, the robot refrigerator may directly detect an obstacle, avoiding the detected obstacle, and move along.

The main body 110 may further include an output unit 117 configured to output a current status of the robot refrigerator to the exterior, and an input unit 116 configured to directly receive a command from the exterior.

The input unit 116 may be configured as a receiving unit for receiving the remote control signal from the external device, a plurality of buttons for allowing the user to directly input an instruction therewith, or the like. The output unit 117 may include a display unit such as a light emitting diode (LED), a liquid crystal display (LCD), and the like, for displaying a current state of the refrigerator or displaying information regarding whether or not the remote control signal has been received.

FIGS. 4 to 7 are views for explaining embodiments of the refrigerator according to the present invention. A robot refrigerator illustrated in FIG. 4 includes a door 160 having a domed sliding opening and closing unit on the ceiling, and opening and closing the storage space by moving forward and backward according to the interior of the cover. A robot refrigerator illustrated in FIG. 5 includes a domed cap-type door 160 having a hinge 161 connected to one side and allowing the domed door 160 to be thrown back by 180 or more and open. A robot refrigerator illustrated in FIG. 6 includes drawer-type doors 164 and 166 having handles 163 and 165 provided at the central portions, and further includes a movable handle 162 installed on an upper end thereof. A robot refrigerator illustrated in FIG. 7 includes a door 168 which is open and closed based on a hinge 170 installed at the other end by using a door handle 167.

The robot refrigerator system and its operation according to an exemplary embodiment of the present invention will now be described with reference to FIGS. 1 to 10.

Figure 8:
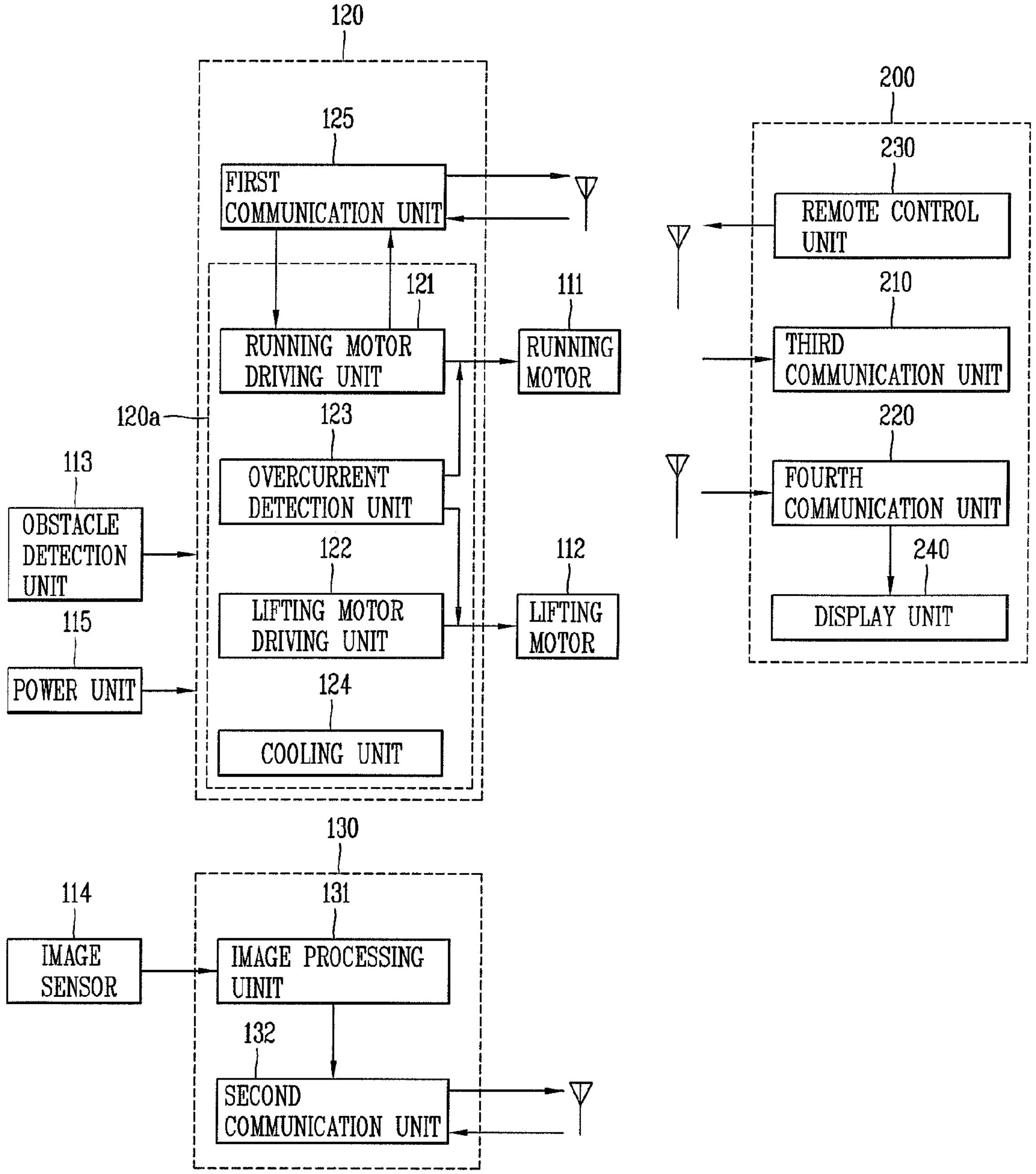
FIG. 8 is a block diagram showing a detailed configuration of a robot refrigerator system according to an exemplary embodiment of the present invention.

First, with reference to FIG. 8, the robot refrigerator system according to an exemplary embodiment of the present invention includes a robot refrigerator 100 having a storage space therein and wheels 150 provided at a lower portion thereof, transmitting current status information and image information according to a surrounding image, and moving based on a remote control signal, and a wireless communication device 200 configured to generate the remote control signal based on the current status information and the image information of the robot refrigerator 100 and transmit the remote control signal to control the robot refrigerator 100. In this case, the remote control signal may be generated based on the image information.

Here, the robot refrigerator includes a running motor 111 rotating the wheels to move the main body, a lifting motor 112 lifting or lowering the storage space, a running motor driving unit 121 configured to drive the running motor based on the remote control signal, a lifting motor driving unit 122 configured to drive the lifting motor based on the remote control signal or according to a direct input command from an input unit (to be described), a cooling unit 124 configured to adjust the temperature in the interior of the storage space, a first communication unit 125 configured to transmit the status information to the wireless communication unit, and a second communication unit 132 configured to transmit the image information to the wireless communication unit. Here, the first communication unit 125 performs transmission and reception through a small capacity radio data communication unit, e.g., Bluetooth™ and the second communication unit 132 performs transmission and reception through a large capacity radio data communication unit, e.g., Wi-Fi. The robot refrigerator further includes an obstacle detection unit configured to detect a nearby obstacle. In addition, the robot refrigerator may further include a power unit 115 connected to an external power source, namely, a power supply unit 300 (to be described), so as to be charged, and supplying power when the robot refrigerator is moving.

The robot refrigerator 100 may be operated through a single microcomputer or the like, or according to circumstances, the robot refrigerator 100 may include a first control unit configured to transmit status information to the wireless communication device 200 and control the operation of the main body based on a remote control signal from the wireless communication device 200, and a second control unit configured to generate image information from a surrounding image and transmit the generated image information to the wireless communication device 200. In the latter case, the first control unit transmits status information of the main body 110, namely, an inner temperature of the refrigerator, ambient temperature, the amount of storage items, a remaining battery capacity, and the like, to the wireless communication device 200 and receives a remote control signal from the wireless communication device 200. Also, the second control unit 130 captures an ambient image to generate image information and transmits the generated image information to the wireless communication device 200. In this case, the robot refrigerator and the wireless communication device 200 are connected in real time, so the surroundings of the robot refrigerator can be monitored and the robot refrigerator can be moved in real time according to a remote control signal from the wireless communication device 200.

A direct current (DC) motor is generally used as the running motor 111. The running motor 111 moves the main body 110 of the robot refrigerator to a user desired location.

The running motor driving unit 121 drives the running motor 111 according to a remote control signal from the wireless communication device 200 to move the main body 110 of the robot refrigerator to a user desired location. The lifting motor driving unit 122 drives the lifting motor according to a remote control signal or a direct input command in order to allow the user to easily select a storage item or store an item within the refrigerator.

The cooling unit 124 includes a relay and a driving unit for driving the relay to refrigerate or freezing storage items within the refrigerator.

Namely, the surrounding image acquired through an image sensor 114 provided in the main body 110 of the refrigerator is processed by the image processing unit 131 to generate the image information, and the image information is transmitted to the external device through the second communication unit 132.

The robot refrigerator according to an exemplary embodiment of the present invention may further include an obstacle detection unit 113 configured to detect a nearby obstacle, and whether to move the robot refrigerator is determined according to the presence or absence of an obstacle. Also, the robot refrigerator according to an exemplary embodiment of the present invention may further include a power unit 115 connected to an external power source, namely, a power supply unit 300, so as to be charged, and supplying power when the robot refrigerator is moving. An infrared sensor, a radio frequency (RF) sensor, a supersonic sensor, and the like, may be used as the obstacle detection unit 113. In an exemplary embodiment of the present invention, when the robot refrigerator moves according to a remote control signal corresponding to the image information transmitted through the second control unit 130, when the robot refrigerator receives no remote control signal, or when the robot refrigerator cannot transmit image information, the robot refrigerator may directly detect an obstacle, avoiding the detected obstacle, and move along.

The main body 110 may further include an output unit 117 configured to output a current status of the robot refrigerator to the exterior, and an input unit 116 configured to directly receive a command from the exterior.

The input unit 116 may be configured as a receiving unit for receiving the remote control signal from the external device, a plurality of buttons for allowing the user to directly input an instruction therewith, or the like. The output unit 117 may include a display unit such as a light emitting diode (LED), a liquid crystal display (LCD), and the like, for displaying a current state of the refrigerator or displaying information regarding whether or not the remote control signal has been received.

With reference to FIG. 3 together, the robot refrigerator system according to an exemplary embodiment of the present invention may further include a power supply unit 300 connected with the robot refrigerator, supplying power to the robot refrigerator, or charging the power unit. Here, the power supply unit may include a location signal generation unit 310 configured to transmit an induction signal for inducing the robot refrigerator to return. Namely, the location signal generation unit 310 transmits a current location of the power supply unit 300 to the robot refrigerator 100 to allow the robot refrigerator 100 to each reach the power supply unit 300.

The wireless communication unit 200 includes a third communication unit 210 configured to receive the status information from the robot refrigerator and transmitting the remote control signal to the robot refrigerator, and a fourth communication unit 220 configured to receive the image information from the robot refrigerator.

Here, the third communication unit 210 performs transmission and reception through a small capacity radio data communication unit, e.g., Bluetooth™, and the fourth communication unit 220 performs transmission and reception through a relatively large capacity radio data communication unit, e.g., Wi-Fi. Also, the wireless communication device 200 further includes a display unit 240 configured to display the received status information and image information. Also, the wireless communication device 200 may further include a remote control unit 230 configured to generate a remote control signal based on the image information or based on the image information and the status information and transmit the generated remote control signal.

In the robot refrigerator system according to an exemplary embodiment of the present invention, the wireless communication device 200 may be one of a mobile phone, a personal digital assistant (PDA), and a smartphone.

Figure 9:
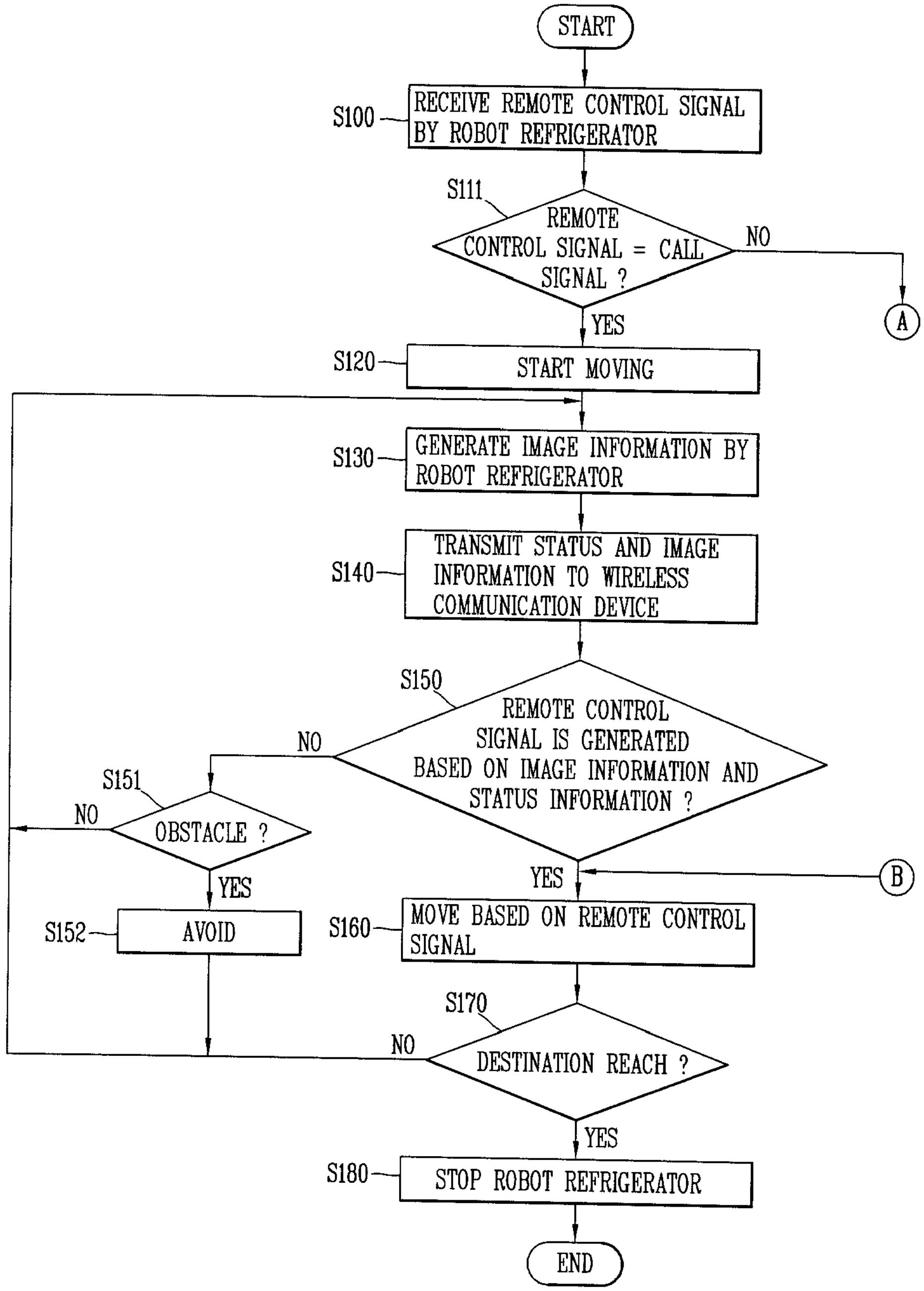
FIGS. 9 and 10 are a flow chart illustrating the process of operating the robot refrigerator system of FIG. 8.
Figure 10:
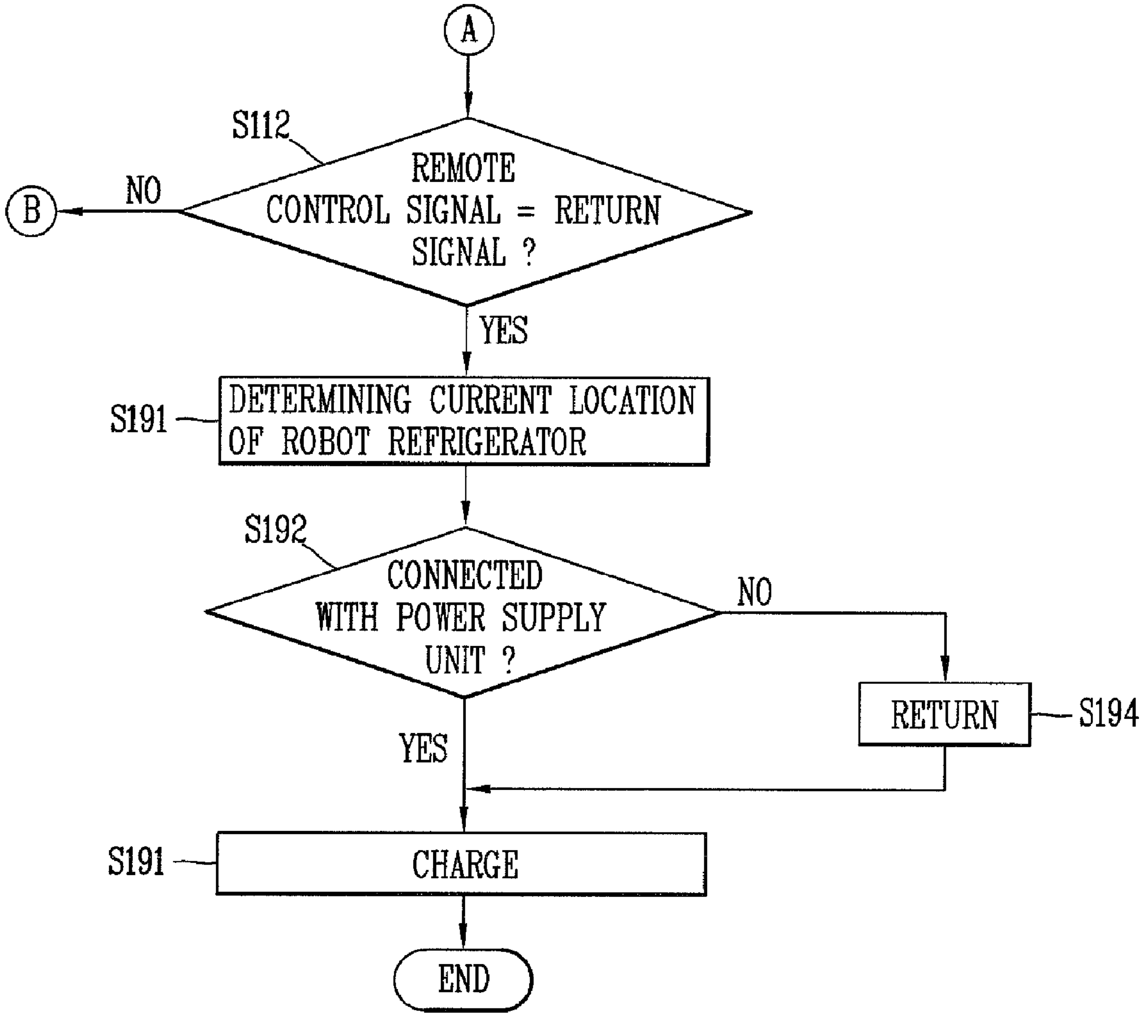

The operation of the robot refrigerator system according to an exemplary embodiment of the present invention will now be described with reference to FIGS. 9 and 10. The device configuration will be described with reference to FIGS. 1 to 8. First, when the robot refrigerator 100 receives a remote control signal from the wireless communication device 200 (S100), the robot refrigerator 100 determines what kind of the remote control signal it is. When the remote control signal is a call signal (S111), the robot refrigerator 100 starts moving (S120). While on the move, the robot refrigerator 100 captures a surrounding image to generate image information (S130) and transmits the image information and status information of the robot refrigerator to the wireless communication device 200 (S140). In this case, the status information may include an inner temperature of the refrigerator, ambient temperature, a remaining capacity of the power unit, i.e., a remaining battery capacity, the presence or absence of an obstacle, the amount of storage items, and the like. The wireless communication device 200 generates a remote control signal based on the image information or based on the image information and the status information and transmits the generated remote control signal to the robot refrigerator 100. In this case, when the robot refrigerator 100 transmits a real time surrounding image acquired through the image sensor to the wireless communication device 200, the wireless communication device 200 can observe the surroundings of the movement path of the robot refrigerator in real time and the user can easily issue a command (or instruction) to allow the robot refrigerator to avoid an obstacle (S160). Meanwhile, the robot refrigerator 100 may include an obstacle detection unit by which the robot refrigerator can perform an obstacle avoidance function although the remote control signal is not generated (S151 and S152).

When the robot refrigerator 100 reaches a destination according to the remote controlling by the wireless communication device 200 (S170), the robot refrigerator 100 stops to supply a storage item to the user (S180).

Meanwhile, when the remote control signal is a return signal (S112), for example, when the remaining battery capacity, among the status information of the robot refrigerator 100, is smaller than a certain level, a current location of the robot refrigerator is determined (S191). When the robot refrigerator is connected with the power supply unit according to the determination result (S192), the robot refrigerator performs a charging operation (S193), and when the robot refrigerator is not connected with the power supply unit, the robot refrigerator is retuned to the power supply unit.

As so far described, the robot refrigerator and the robot refrigerator system including the same according to exemplary embodiments of the present invention have the following advantages. That is, the refrigerator can be moved to the user location through remote controlling, so the user can easily use the refrigerator. Also, when the robot refrigerator is on the move, image information is received in real time to allow the robot refrigerator to avoid an obstacle, so the robot refrigerator can quickly reach the user location.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A robot refrigerator, comprising:

a main body having a storage space therein and a plurality of wheels disposed at a lower portion thereof;

a first controller configured to control the robot refrigerator to start moving when a first remote control signal is received and transmit status information related to an inner status or an outer status of the robot refrigerator to an external device while the robot refrigerator is moving; and a second controller configured to generate image information from a surrounding image and transmit the generated image information to the external device while the robot refrigerator is moving, wherein the first remote control signal includes a return signal for power charging of the main body or a call signal for calling the main body to a user, wherein the image information is generated by the second controller and transmitted to the external device when the first remote control signal corresponds to the call signal and the image information is not generated by the second controller when the first remote control signal corresponds to the return signal, wherein the external device generates a second remote control signal based on at least one of the status information or the generated image information, and wherein the first controller controls operation of the main body based on the second remote control signal.

2. The robot refrigerator of claim 1, further including:

a running motor provided in the main body that rotates the plurality of wheels to move the main body; and a lifting motor provided in the main body that lifts and lowers the storage space.

3. The robot refrigerator of claim 2, wherein the first controller includes:

a running motor drive configured to drive the running motor based on the first or second remote control signal;

a lifting motor drive configured to drive the lifting motor;

a cooling device configured to adjust a temperature in an interior of the storage space; and a first communication device configured to transmit the status information to the external device.

4. The robot refrigerator of claim 3, wherein the second controller includes:

an image processor configured to process the surrounding image to generate the image information; and a second communication device configured to transmit the image information to the external device.

5. The robot refrigerator of claim 4, further including an obstacle detector configured to detect a nearby obstacle, wherein the first controller determines whether to move the robot refrigerator according to the presence or absence of the obstacle.

6. The robot refrigerator of claim 4, further including a power device connected to an external power source so as to be charged, that supplies power when the robot refrigerator is moving.

7. The robot refrigerator of claim 4, wherein the main body includes:

an output configured to output a current status of the robot refrigerator to an exterior; and an input configured to directly receive a command from the exterior.

8. The robot refrigerator of claim 4, wherein the second remote control signal is generated based on the image information.

9. A robot refrigerator system, comprising:

a robot refrigerator having a main body that includes a storage space therein and a plurality of wheels provided at a lower portion thereof, wherein the robot refrigerator starts moving when a first remote control signal is received, and transmits current status information related to an inner status or an outer status of the robot refrigerator and image information according to a surrounding image while the robot refrigerator is moving, wherein the first remote control signal includes a return signal for power charging of the main body or a call signal for calling the main body to a user, wherein the image information is generated by a controller and transmitted to the external device when the first remote control signal corresponds to the call signal and the image information is not generated by the controller when the first remote control signal corresponds to the return signal; and a wireless communication device configured to generate a second remote control signal based on at least one of the current status information or the image information of the robot refrigerator and transmit the second remote control signal to the robot refrigerator, wherein the robot refrigerator controls operation of the main body based on the second remote control signal.

10. The system of claim 9, wherein the robot refrigerator includes:

a running motor that rotates the plurality of wheels to move the main body;

a lifting motor that lifts and lowers the storage space;

a running motor drive configured to drive the running motor based on the first or second remote control signal;

a lifting motor drive configured to drive the lifting motor;

a cooling device configured to adjust a temperature in an interior of the storage space;

a first communication device configured to transmit the current status information to the wireless communication device; and a second communication device configured to transmit the image information to the wireless communication device.

11. The system of chum 10, wherein the first communication device and the second communication device perform transmission and reception through a wireless communication protocol.

12. The system of claim 10, wherein the robot refrigerator further includes an obstacle detector configured to detect a nearby obstacle.

13. The system of claim 10, Wherein the robot refrigerator further includes a power device connected to an external power source so as to be charged, that supplies power when the robot refrigerator is moving.

14. The system of claim 13, wherein the robot refrigerator system further includes a power supply connected with the robot refrigerator, that supplies power to the robot refrigerator from an external power source, or charges the power device.

15. The system of claim 14, wherein the power supply includes a location signal generator configured to transmit an induction signal for inducing the robot refrigerator to return.

16. The system of claim 10, wherein the wireless communication device includes:

a third communication device configured to receive the current status information from the robot refrigerator and transmit the second remote control signal to the robot refrigerator; and a fourth communication device configured to receive the image information from the robot refrigerator.

17. The system of claim 16, wherein the third communication device and the fourth communication device perform transmission and reception through a wireless communication protocol.

18. The system of claim 16, wherein the wireless communication device further includes a display configured to display the received current status information and the image information.

19. The system of claim 9, wherein the wireless communication device is one of a mobile phone, a personal digital assistant (PDA), or a smartphone.

20. The system of claim 9, wherein the current status information includes at least one of an inner temperature of the robot refrigerator, an ambient temperature, an amount of storage items, or a remaining battery capacity.

21. The system of claim 16, wherein the wireless communication protocol of the first communication device and the wireless communication protocol of the second communication device are different from each other, and wherein the wireless communication protocol of the third communication device and the wireless communication protocol of the fourth communication device are different from each other.

* * * * *